United States Patent
Shanks

(10) Patent No.: US 10,329,898 B2
(45) Date of Patent: *Jun. 25, 2019

(54) HIGH TEMPERATURE DOWNHOLE GAUGE SYSTEM

(71) Applicant: Zenith Oilfield Technology Limited, Inverurie (GB)

(72) Inventor: David Sirda Shanks, Aberdeen (GB)

(73) Assignee: Zenith Oilfield Technology Limited, Inverurie (GB)

( * ) Notice: Subject to any disclaimer, the term of this patent is extended or adjusted under 35 U.S.C. 154(b) by 475 days.

This patent is subject to a terminal disclaimer.

(21) Appl. No.: 14/961,068

(22) Filed: Dec. 7, 2015

(65) Prior Publication Data

US 2016/0084073 A1 Mar. 24, 2016

Related U.S. Application Data

(63) Continuation of application No. 13/884,478, filed as application No. PCT/GB2011/052230 on Nov. 16, 2011, now Pat. No. 9,234,419.

(30) Foreign Application Priority Data

Nov. 19, 2010 (GB) .................................. 1019567.5

(51) Int. Cl.
E21B 47/06 (2012.01)
G01L 7/00 (2006.01)
(Continued)

(52) U.S. Cl.
CPC ............ *E21B 47/06* (2013.01); *E21B 47/011* (2013.01); *E21B 47/065* (2013.01);
(Continued)

(58) Field of Classification Search
None
See application file for complete search history.

(56) References Cited

U.S. PATENT DOCUMENTS 3,981,187 A 9/1976 Howell
4,267,727 A 5/1981 Hoppe
(Continued)

FOREIGN PATENT DOCUMENTS

CA 2323234 4/2001
CN 1367858 9/2002
(Continued)

OTHER PUBLICATIONS

Kane, et al., "Applications of time domain reflectometry to landslide and slope monitoring", TDR 2002-Second International Symposium and Workshop on Time Domain Reflectometry for Innovative Geotechnical Application, pp. 1-14, Dec. 31, 2001.
(Continued)

*Primary Examiner* — Andre J Allen
(74) *Attorney, Agent, or Firm* — Crowe & Dunlevy, P.C.

(57) ABSTRACT

A gauge system and method for monitoring well pressure at temperatures in excess of 300° C. used in permanent monitoring of oil and gas wellbores. The gauge system includes an analog output transducer and a long cable which is an extruded mineral insulated multi-core cable with a seam welded corrosion resistant metal outer sheath. The transducer is enclosed in a pressure tight corrosion resistant housing and the housing is pressure sealed to the metal outer sheath. The method includes applying signal conditioning and processing to the measurements to compensate for characteristics of the transducer, the cable and the environment and thereby provide continuous monitoring of the wellbore.

24 Claims, 3 Drawing Sheets

Figure 1:
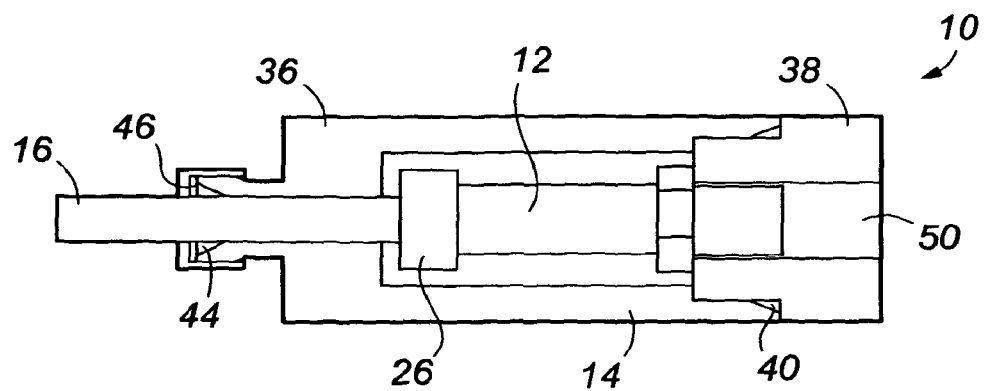

(51) Int. Cl.
- *G01L 19/00* (2006.01)
- *G01D 11/24* (2006.01)
- *G01L 19/06* (2006.01)
- *G01L 19/14* (2006.01)
- *E21B 47/01* (2012.01)
- *G01L 19/04* (2006.01)

(52) U.S. Cl.
CPC ........ *G01D 11/245* (2013.01); *G01L 19/0084* (2013.01); *G01L 19/04* (2013.01); *G01L 19/0672* (2013.01); *G01L 19/149* (2013.01)

(56) References Cited

U.S. PATENT DOCUMENTS

| | | |
|---|---|---|
| 4,429,273 A | 1/1984 | Mazzagatti |
| 4,597,183 A | 7/1986 | Broding |
| 4,909,855 A | 3/1990 | Burley |
| 5,010,316 A | 4/1991 | Burley |
| 5,025,222 A | 6/1991 | Scott et al. |
| 5,030,294 A | 7/1991 | Burley |
| 5,033,297 A | 7/1991 | Gustafson |
| 5,132,903 A | 7/1992 | Sinclair |
| 5,231,880 A | 8/1993 | Ward et al. |
| 5,571,394 A | 11/1996 | Hettiarachchi et al. |
| 5,818,241 A | 10/1998 | Kelly |
| 5,926,024 A | 7/1999 | Blount et al. |
| 6,064,002 A | 5/2000 | Hayami et al. |
| 6,227,045 B1 | 5/2001 | Morse et al. |
| 6,441,622 B1 | 8/2002 | Wrzesinski et al. |
| 6,539,795 B1 | 4/2003 | Scherpenisse et al. |
| 7,017,417 B2 | 3/2006 | Daigle |
| 7,190,280 B2 | 3/2007 | Hall et al. |
| 7,409,858 B2 | 8/2008 | Dria et al. |
| 7,730,774 B2 | 6/2010 | Glasbergen et al. |
| 8,074,713 B2 | 12/2011 | Ramos et al. |
| 8,973,434 B2 | 3/2015 | Albrecht et al. |
| 9,234,419 B2 * | 1/2016 | Shanks .................. E21B 47/06 |
| 2003/0122535 A1 | 7/2003 | Williams et al. |
| 2004/0031681 A1 | 2/2004 | Jett et al. |
| 2004/0059513 A1 | 3/2004 | Bittar et al. |
| 2004/0096614 A1 | 5/2004 | Quigley et al. |
| 2005/0034873 A1 | 2/2005 | Coon et al. |
| 2005/0083062 A1 | 4/2005 | Couch |
| 2005/0172721 A1 | 8/2005 | Daigle |
| 2005/0265121 A1 | 12/2005 | Scott |
| 2005/0274513 A1 | 12/2005 | Schultz et al. |
| 2006/0108112 A1 | 5/2006 | Simon |
| 2006/0214098 A1 | 9/2006 | Ramos |
| 2007/0071612 A1 | 3/2007 | Yuratich |
| 2007/0119244 A1 | 5/2007 | Goodwin et al. |
| 2007/0125163 A1 | 6/2007 | Dria et al. |
| 2007/0158064 A1 | 7/2007 | Pribnow et al. |
| 2007/0239360 A1 | 10/2007 | Rabinovich et al. |
| 2008/0048669 A1 | 2/2008 | Scherber et al. |
| 2008/0061789 A1 | 3/2008 | Coates |
| 2008/0083273 A1 | 4/2008 | Sroka et al. |
| 2008/0185138 A1 | 8/2008 | Hernandez-Solis et al. |
| 2008/0224705 A1 | 9/2008 | Simon et al. |
| 2008/0317095 A1 | 12/2008 | Hadley et al. |
| 2009/0277629 A1 | 11/2009 | Mendez et al. |
| 2009/0326826 A1 | 12/2009 | Hull et al. |
| 2010/0223011 A1 | 9/2010 | Parsche |
| 2010/0254650 A1 | 10/2010 | Rambow |
| 2011/0007776 A1 | 1/2011 | Yamamoto |
| 2011/0081256 A1 | 4/2011 | Thompson et al. |
| 2011/0188344 A1 | 8/2011 | Hartog et al. |
| 2011/0311179 A1 | 12/2011 | Greenaway |
| 2012/0075951 A1 | 3/2012 | Johnson et al. |
| 2013/0091942 A1 | 4/2013 | Samson et al. |
| 2014/0069810 A1 | 3/2014 | Tachibana et al. |
| 2015/0090040 A1 | 4/2015 | Schumacher et al. |
| 2015/0233211 A1 | 8/2015 | Bujold et al. |

FOREIGN PATENT DOCUMENTS

| | | |
|---|---|---|
| CN | 1723332 | 1/2006 |
| CN | 2900784 | 5/2007 |
| CN | 101313127 | 11/2008 |
| CN | 101598581 | 12/2009 |
| CN | 201396147 | 2/2010 |
| DE | 2521411 | 11/1976 |
| DE | 19950111 | 2/2001 |
| DE | 10052922 | 5/2002 |
| EP | 0508894 | 10/1992 |
| EP | 1098197 A2 | 5/2001 |
| EP | 1574853 A1 | 9/2005 |
| GB | 2159663 | 12/1985 |
| GB | 2246866 | 2/1992 |
| GB | 2467177 | 7/2010 |
| GB | 2484990 | 5/2012 |
| GB | 2495132 | 4/2013 |
| WO | 199100996 A1 | 1/1991 |
| WO | 0011317 | 3/2000 |
| WO | 2007109772 A2 | 9/2007 |
| WO | 2011044023 | 4/2011 |
| WO | 2012/052764 | 4/2012 |

OTHER PUBLICATIONS

Jie, et al., "Introduction to Numerical Simulation of Electrical Logging and Its Development Trend", Well Logging Technology, vol. No. 34, Issue No. 1, pp. 1-5, Feb. 28, 2010.

* cited by examiner

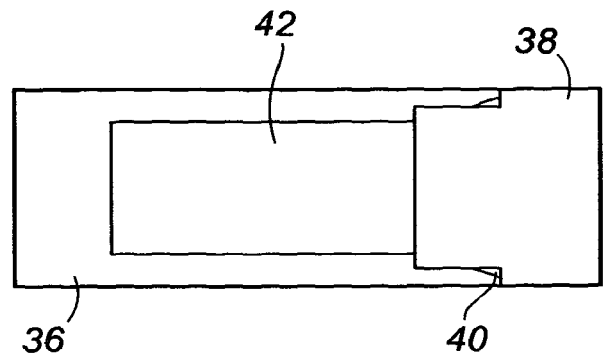
Fig. 4
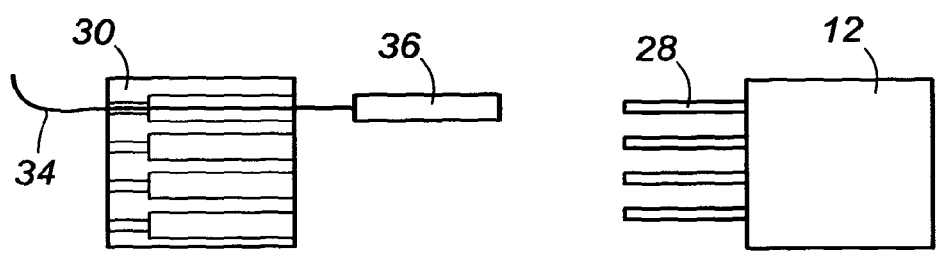
Fig. 3a
Fig. 3b
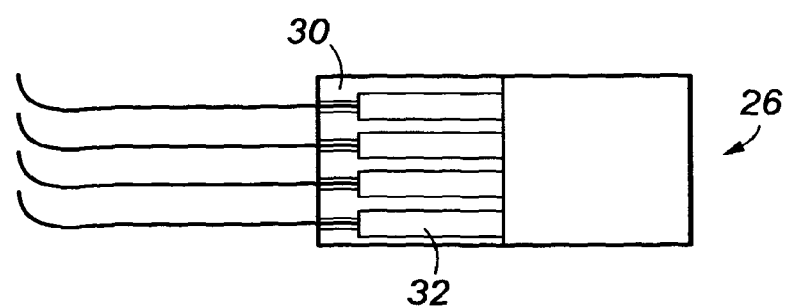
Fig. 3c

HIGH TEMPERATURE DOWNHOLE GAUGE SYSTEM

CROSS REFERENCE TO RELATED APPLICATIONS

The present application is a continuation of U.S. patent application Ser. No. 13/884,478, filed Nov. 16, 2011, which is a National Stage Application under 35 U.S.C. 371 of International Application No. PCT/GB2011/52230, filed Nov. 16, 2011, which claims priority to Great Britain Patent Application No. 1019567.5, filed Nov. 19, 2010, the contents of all of which are incorporated herein by reference.

The present invention relates to permanent monitoring in oil and gas wellbores and in particular, though not exclusively, to a gauge system for monitoring well pressure at temperatures in excess of 300° C.

Downhole pressure and temperature gauges are routinely installed in wellbores to provide continuous reservoir monitoring. The gauge is typically mounted in a side pocket on the tubing. A cable is run up the outside of the tubing to connect the gauge to surface where signal processing and control is carried out. Current gauges have short life spans and give erroneous results when installed in very high temperature environments where the point of measurement is a long way from the measurement apparatus. Such environments are found in deep geothermal wells, deep oil wells, and in oil production schemes which use heating methods to reduce the viscosity of oil such as steam injection and in situ combustion.

Further disadvantages are found in using current technology to measure pressure in deep well bores and at extremely high temperatures. While transducers exist that can operate at very high temperatures, they are not able to withstand the hostile downhole environment nor can they be operated across a long cable. The transducers use wire connections which are difficult to form or operate reliably in very high temperature environments. Long cables are currently only available with either rubber of plastic insulation which does not survive at high temperatures. Some long cables using glass fibre exist but the glass becomes conductive and as such not suitable for this application. As cable length increases, greater errors and variable offsets in analogue measurements occur, producing poor quality measurements.

We define a long cable as having a length in excess of 1000 meters, and a high temperature being in excess of 300° C.

It is an object of the present invention to provide a downhole pressure gauge operable in deep wellbores at high temperatures.

It is a further object of the present invention to provide a method of obtaining a pressure measurement in a deep wellbore at high temperatures.

According to a first aspect of the present invention there is provided a gauge system for use in wellbores, the system comprising an analogue output transducer and a long cable, wherein the cable is an extruded mineral insulated multi-core with a seam welded corrosion resistant metal outer sheath; the transducer is enclosed in a pressure tight corrosion resistant housing; and the housing is pressure sealed to the metal outer sheath.

In this way, a transducer which is operational at high temperatures, coupled to a specially adapted mineral insulated (MI) cable can be used to continuously monitor in a high temperature wellbore.

Preferably, the transducer is an analogue output pressure sensor. More preferably, the pressure sensor is a silicon-on-insulator sensor. Preferably also, the sensor is configured in a Wheatstone bridge arrangement. Such a mono-crystalline silicon sensor has no pn junction and is dielectrically isolated. Accordingly, the temperature is not limited to 150° C. and can operate at temperatures over 600° C.

Preferably, the transducer is configured as a strain wire type. More preferably, the transducer has a ceramic mounting.

In this way, operation at extremely high temperature can be achieved.

Preferably the cable comprises at least one elongate electrical conductor within a metal sheath, the conductor being insulated from the sheath by means of a compacted mineral insulating powder. Such cables are known, at short lengths narrow diameters, for use in systems operating in fires. These cables are unsuitable for use in deep wells as the metal sheath is highly corrosive. Advantageously, the cable includes a further sheath of corrosion resistant metal, wrapped as a thin strip around the cable and seam welded. Preferably, the cable is drawn down to a diameter of approximately 0.25 inch.

Preferably, the cable includes at least one additional core and at least one analogue temperature sensor, wherein the temperature sensor is mounted on the cable. In this way, temperature measurements can be made along the cable to assist in signal correction at surface.

Preferably, connectors within the housing are plastic and rubber free. More preferably, the connectors are formed from metal contacts and ceramic insulators. In this way, the connections will not be affected by the high temperatures.

Preferably, the seals are plastic and rubber free. More preferably, the seals are metal seals which are able to withstand the high temperatures.

Preferably, the corrosion resistant materials and metals are stainless steel. Alternatively, the corrosion resistant materials and metals are Inconel alloys. The selection of material can be made based on the nature of the fluids likely to be in the well.

Preferably, the system includes an AC power supply. Alternatively, the system includes a slow DC reversing power supply. By alternating the power supply, offsets created by permanent charge build-ups over a long cable, can be measured and removed.

Preferably, the cable includes at least one passive sense wire. By measuring voltage drops in the cable and insulation loss across the cable, the actual voltage delivered to the sensor can be determined.

Preferably the system includes a signal conditioning and processing unit. In this way, the output from the transducer can be corrected to provide accurate measurements over periods of time to provide continuous monitoring.

According to a second aspect of the present invention there is provided a method of continuous monitoring in a wellbore, the method comprising the steps:

(a) connecting an analogue output transducer to a long cable of extruded mineral insulated multi-core with a seam welded corrosion resistant metal outer sheath;
(b) mounting the transducer and connector in a pressure tight corrosion resistant housing;
(c) pressure sealing the housing against the metal outer sheath;
(d) mounting the housing on tubing and running the tubing into a wellbore, to a high temperature location;
(e) taking measurements from the transducer;
(f) applying signal conditioning and processing to the measurements to compensate for characteristics of the transducer, the cable and the environment and thereby provide continuous monitoring of the wellbore.

In this way, continuous monitoring of a high temperature wellbore can be achieved.

Preferably, the transducer is a pressure transducer. More preferably, the method includes the steps of characterising the transducer behaviour over a range of temperatures and pressures. In this way, the measurements can be mathematically compensated to provide more accurate results.

Preferably, the method includes the step of measuring temperature in the wellbore. In this way, the mathematical compensation can be more correctly applied.

Preferably, the method includes the step of monitoring insulation leakage and compensating for this. In this way, any loss measured can be used to compensate the transducer output for the same loss.

Preferably, the method includes the step of alternating the power supply, measuring the permanent charge build-ups on the cable and removing this error from the measurements. This removes the offsets caused by the residual charge effect which occurs over long cables.

Preferably, the method includes the step of filtering the received signal at a frequency of the AC power supply. This assists in noise reduction on the measurements.

Figures 2A, 2B:
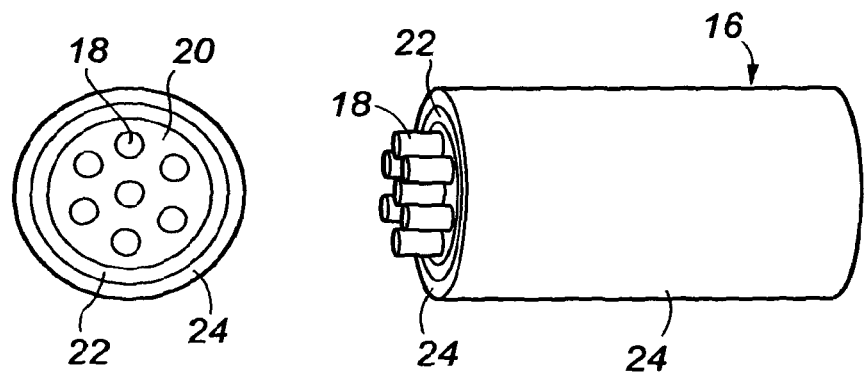
Figure 5:
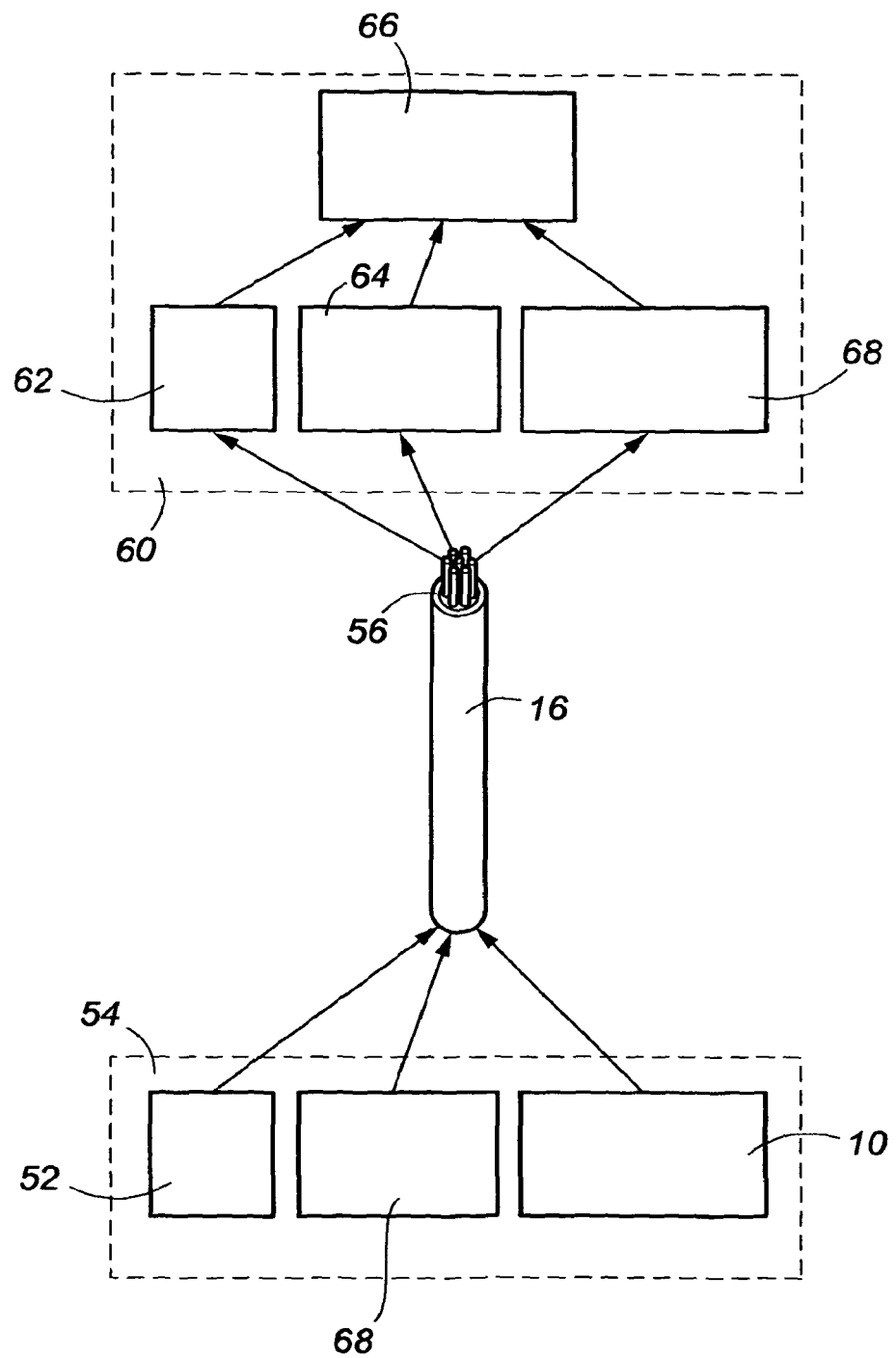

Embodiments of the present invention will now be described, by way of example only, with reference to the following drawings, of which:

FIG. 1 is a schematic illustration of a gauge system for use in a wellbore, according to an embodiment of the present invention;

FIGS. 2(a) and (b) are schematic illustrations of a cable, for use in the gauge system of FIG. 1;

FIGS. 3(a)-(c) are schematic illustrations of a connector, for use in the gauge system of FIG. 1;

FIG. 4 is a schematic illustration of a housing, for use in the gauge system of FIG. 1; and FIG. 5 is a schematic illustration of a gauge system, illustrating a method of monitoring, according an embodiment of the present invention.

Referring initially to FIG. 1, there is illustrated a gauge system, generally indicated by reference numeral 10, for use in a wellbore at high temperatures. Gauge system 10 comprises an analogue output transducer 12 enclosed in a pressure tight corrosion resistant housing 14, and the housing 14 is pressure sealed against a long cable 16, which connects the gauge system 10 to the surface of the wellbore.

Transducer 12 is a pressure transducer. It is a silicon-on-insulator semiconductor piezo-electric pressure sensor. It is formed from two wafers, one forming the p-type diffused mono-crystalline silicon piezoresistors in a Wheatstone bridge arrangement while the second acts as a silicon diaphragm. The wafers are fusion bonded together. The entire chip is mounted on Pyrex® and encapsulated to be hermetically sealed. The sensor can operate in temperatures in excess of 600° C. and measure pressures over 5000 psi. These sensors are manufactured by Kulite Semiconductor Products Inc., New Jersey, USA.

The sensor 12 output from the Wheatstone bridge is designed with a high impedance, typically several kilo ohms. This is in contrast to short range sensors of several hundred ohms. This improves the transmission of the signals to surface.

The long cable 16 is attached to the transducer 12, as will be described hereinafter with reference to FIG. 4. In this specification we define long as in excess of 1000 meters. Reference is now made to FIG. 2 of the drawings which illustrates an (a) cross-sectional view and (b) plan view of a cable 16, according to an embodiment of the present invention.

Cable 16 comprises seven conductors 18, encased in a mineral insulator 20, enclosed in a metal sheath 22 which is surrounded by a non-corrosive metal outer sheath 24. The metal sheath 22 may be copper.

Conductors 18 run the entire length of the cable 16 and are made of high temperature materials such as stainless steel or nickel based alloys. Examples of nickel based alloys include alloys of nickel with copper, e.g. having between 25% and 75% nickel, such as cupronickel, and Monel, and other alloys comprising nickel with chromium and/or with cobalt, e.g. Ni,Cr,Fe,Co alloys. Examples of such alloys include those sold under the trademarks 'Inconel' and 'Incoloy'. Alternatively pure nickel may be employed.

The mineral insulator 20, is silica combined with a binder material such as a metal oxide or boron nitride. The silica is selected to withstand the high temperatures while the binder is used to prevent deformation of the silica during the cable formation process which can cause splitting of the sheath 22.

MI cables having a single metal sheath are currently produced by an extruding technique. For example, a strip of metal and one or more elongate conductors are transported along their length and the strip is continuously formed into a tube that encloses the or each conductor, opposed longitudinally extending edges of the strip are welded together, mineral insulant is inserted into the tube to form a cable preform. The cable preform is then continuously drawn through sets of shaped rollers which reduce the cross-sectional area of the preform by about 80 to 99%. Annealing stages are located between the sets of rollers and after the last set of rollers. Typically, the drawing stage will comprise three sets of rollers, each with 14 pairs of rollers arranged at 90° with respect to each other, and three annealing stages. The annealing temperature usually lies in the range of 350 to 6500 C, depending on the speed of the cable preform through the annealing stage. This process provides a typical seven core cable of diameter approx. 11 mm and length approx. 350 m.

In an embodiment of the present invention, the cable 16 is manufactured by a similar technique, however, an outer sheath 24 comprising a non-corrosive material such as stainless steel or Iconel, is formed from a strip, seam welded around the metal sheath 22. In order to achieve the desired diameter of a quarter inch (6.35 mm) and continuous lengths in excess of 1000 m, a significantly larger preform is created and drawn through a greater number of sets of rollers and annealing stages. A resulting coil of cable 16 will have a diameter of a few meters.

Returning to FIG. 1, the cable 16 is attached to the transducer 12, using a specially constructed connector 26. Connector 26 is shown in greater detail in FIGS. 3(a)-(c). Connector 26 is formed in two parts and based on crimping connector technology. Transducer 12 has a series of connector pins 28 (FIG. 3(b)). A connector body 30, formed of ceramic, has machined ducts 32. High temperature cable strands 34 are arranged for connection to cable 16 (not shown). Strands 34 are fed through the ducts 32 and terminate at metal tubes 36. This is shown in FIG. 3(a). Each tube 36 locates over a corresponding connector pin 28. The tube 36 is then crimped onto the connector pin 28. Body 30 is pushed towards the transducer 12, with the crimped tubes 36 sliding into the ducts 32. When assembled, see FIG. 3(c), all connections are encased in the ceramic body 30. The connector 26 provides a field serviceable connection scheme which is then used in conjunction with the sensor 12 and cable 16 to allow large cable drums to be shipped separately from the wellbore sensor 12. This arrangement also allows replacement of sensors 12.

Returning again to FIG. 1, the gauge system 10 having the transducer 12 connected 26 to the cable 16, is now enclosed in a housing 14. At a first end the cable 16 connects the gauge system 10 to surface and at a second end a pressure port 50 for measuring the pressure downhole. The housing 14 is constructed of a non-corrosive metal or metal alloy. Typically, stainless steel is used. The housing 14 has a body and a base 38 for assembly. The housing 14 must be both pressure tight and protective to the transducer 12.

To make the housing 14 pressure tight, metal seals are used. Referring to FIG. 4, the housing is illustrated with the main seal 40 between the body 36 and the base 38. The pressure sealing comprises a chamber 42 in which the pressure transducer 12 is housed, a base 38 to which the internal components are mounted, an outer pressure housing 36, and a metal seal 40, in the form of a ring, which has a lower yield strength either by material selection or mechanical size than the housing 14.

The energy used to tighten the outer housing 36 to the base 38 energises the seal 40 and creates a pressure sealing contact between the seal 40, base 38 and body 36. This seal 40 has to be energised so that the seal remains sealed even when the metal parts are heated to very high temperatures. Accordingly, the body 36 is designed such that increasing hydrostatic pressure on the outside of the system 10 will apply greater compression force to the seal 40. In this way, the sealing energy increases with increasing pressure.

An identical sealing arrangement is used to seal the housing 14 against the cable 16. Returning to FIG. 1, a metal sealing ring 44 is located against the outer sheath 24 of the cable 16. A seal nut 46 is tightened against the housing body to energise the seal 44. As with the opposing seal 40, between the body 36 and the base 38, the seal is arranged so that hydrostatic pressure outside the system 10 applies greater compression force to the seal 44. While the metal seals 40,44 are described as metal rings, hermetic welding could be used instead. As with the housing parts, the seals are plastic and rubber free, formed from a corrosion resistant material which can withstand high temperatures.

Reference is now made to FIG. 5 of the drawings which illustrates a method of operating the gauge system 10. It is recognised in downhole monitoring that operating a sensor at such distances from the power and signal processing, has inherent difficulties. The present invention provides a number of embodiments to overcome these disadvantages. The signal from the transducer is conditioned and processed to obtain accurate results from this system.

Initially, the sensor i.e. transducer 12 must first be calibrated for use in the high temperature and high pressure environment. This provides characterisation of the sensor behaviour over pressure and temperature and facilitates use of mathematical compensation to achieve more accurate results. Typically the transducer is tested at five different temperatures and ten pressures at each temperature. The output is then be used to generate a $3^{rd}$ or $5^{th}$ order polynomial curve fit over pressure and temperature. This both uses a temperature sensor 52 in the downhole module 54 to compensate the pressure output changes with temperature, and also compensates for any non-linearity in the transducer 12 behaviour over a range of temperatures.

As the sensor 12 is designed with a high impedance output, in the kilo-ohms range, this reduces the effect of the resistance of the cable wires which may also be hundreds of ohms and may change with temperature.

The sensor output is further enhanced by use of sense wires in the cable assembly 16 to sense the actual voltage delivered to the sensor 12. These sense wires are used to sense insulation loss or leakage in the cable 16 by use of an open circuit wire for further compensation. This uses an unused wire 56 in the cable 16 and senses the loss of current to earth (or to the cable sheath 24). Any loss measured is used to compensate the live transducer output for the same loss.

At surface, a control and signal processing module 60 controls power to and processes the signals received from the downhole module 54.

The power supply is an AC power supply 62. It is known that continuous DC current on a long cable can cause permanent charge build ups, and creates offsets in the readings. By alternating the power supply these offsets are measured and removed. The offsets are measured using a mV sensor 68. Those skilled in the art will appreciate that a slow DC reversing system could also be used to remove any residual charge effect from the long cable.

To remove noise on the signal created by other electrical machinery or electronics equipment near the sensor system, a selective tuned filter 64 is located at the input to the signal processing unit 66. The filter 64 is tuned to the frequency of the AC supply 62. In this way the sensor output is extracted from the received signal.

The principle advantage of the present invention is that it provides a downhole pressure gauge operable in deep wellbores (over 1000 m) at high temperatures (over 300° C.).

A further advantage of the present invention is that it provides a method of obtaining a pressure measurement in a deep wellbore at high temperatures.

A yet further advantage of the present invention is that it provides a downhole continuous monitoring system in deep wellbores at high temperatures.

Various modifications may be made to the invention herein described without departing from the scope thereof. For example, any HP/HT sealing arrangement may be used. Additional sensors may also be mounted in the housing.

The invention claimed is:

1. A gauge system for use in wellbores, the system comprising an analogue output transducer and a cable, wherein the cable is an extruded mineral insulated multi-core with a seam welded corrosion resistant metal outer sheath; the transducer is enclosed in a pressure tight corrosion resistant housing; and the housing is pressure sealed to the metal outer sheath.

2. A gauge system according to claim 1 wherein the transducer is an analogue output pressure.

3. A gauge system according to claim 2 wherein the pressure sensor is a silicon-on-insulator sensor.

4. A gauge system according to claim 2 wherein the pressure sensor is a strain wire type using ceramic mounting.

5. A gauge system according to claim 2 wherein the sensor is configured in a Wheatstone bridge arrangement.

6. A gauge system according to claim 1 wherein the cable comprises at least one elongate electrical conductor within a metal sheath, the conductor being insulated from the sheath by means of a compacted mineral insulating powder.

7. A gauge system according to claim 5 wherein the cable includes a further sheath of corrosion resistant metal, wrapped as a thin strip around the cable and seam welded.

8. A gauge system according to claim 1 wherein the cable is drawn down to a diameter of approximately 0.25 inch.

9. A gauge system according to claim 1 wherein the cable includes at least one additional core and at least one analogue temperature sensor, wherein the temperature sensor is mounted on the cable.

10. A gauge system according to claim 1 wherein connectors within the housing are plastic and rubber free.

11. A gauge system according to claim 10 wherein the connectors are formed from metal contacts and ceramic insulators.

12. A gauge system according to claim 1 wherein the pressure seals are metal seals which are able to withstand high temperatures.

13. A gauge system according to claim 1 wherein the corrosion resistant materials and metals are stainless steel.

14. A gauge system according to claim 1 wherein the corrosion resistant materials and metals are Inconel alloys.

15. A gauge system according to claim 1 wherein the system includes an AC power supply.

16. A gauge system according to claim 1 wherein the system includes a slow DC reversing power supply.

17. A gauge system according to claim 1 wherein the cable includes at least one passive sense wire.

18. A gauge system according to claim 1 wherein the system includes a signal conditioning and processing unit.

19. A method of continuous monitoring in a wellbore, the method comprising the steps:
   (a) connecting an analogue output transducer to a cable of extruded mineral insulated multi-core with a seam welded corrosion resistant metal outer sheath;
   (b) mounting the transducer and connector in a pressure tight corrosion resistant housing;
   (c) pressure sealing the housing against the metal outer sheath;
   (d) mounting the housing on tubing and running the tubing into a wellbore, to a high temperature location;
   (e) taking measurements from the transducer; and
   (f) applying signal conditioning and processing to measurements to compensate for characteristics of the transducer, the cable and the environment and thereby provide continuous monitoring of the wellbore.

20. A method according to claim 19 wherein the transducer is a pressure transducer and the method includes the steps of characterising the transducer behaviour over a range of temperatures and pressures.

21. A method according to claim 19 wherein the method includes the steps of measuring temperature in the wellbore.

22. A method according to claim 19 wherein the method includes the step of monitoring insulation leakage and compensating for this.

23. A method according to claim 19 wherein the method includes the step of alternating the power supply, measuring the permanent charge build-ups on the cable and removing this error from the measurements.

24. A method according to claim 19 wherein the method includes the step of filtering the received signal at a frequency of the AC power supply.

* * * * *